United States Patent

Stirnkorb et al.

Patent Number: 6,079,469
Date of Patent: Jun. 27, 2000

[54] TRANSVERSE SEAM SEALING DEVICE FOR A BAG FORMING AND FILLING MACHINE

[75] Inventors: Willi Stirnkorb, Waiblingen; Martin Beck, Urbach, both of Germany

[73] Assignee: Robert Bosch GmbH, Stuttgart, Germany

[21] Appl. No.: 09/043,862

[22] PCT Filed: Sep. 19, 1996

[86] PCT No.: PCT/DE96/01773

§ 371 Date: Mar. 27, 1998

§ 102(e) Date: Mar. 27, 1998

[87] PCT Pub. No.: WO97/13688

PCT Pub. Date: Apr. 17, 1997

[30] Foreign Application Priority Data

Oct. 11, 1995 [DE] Germany .......................... 195 37 833

[51] Int. Cl.⁷ ............................ B29C 65/02; B65B 31/00
[52] U.S. Cl. ..................... 156/515; 156/251; 156/581; 156/583.1
[58] Field of Search ................................ 156/251, 510, 156/515, 580, 581, 583.1, 530

[56] References Cited

U.S. PATENT DOCUMENTS

| | | |
|---|---|---|
| 4,050,916 | 9/1977 | Gausman et al. |
| 4,255,225 | 3/1981 | Evers ........................................ 156/515 |
| 4,490,207 | 12/1984 | Achelpohl ................................ 156/251 |
| 4,630,429 | 12/1986 | Christine .................................. 156/515 |

FOREIGN PATENT DOCUMENTS

| | | | |
|---|---|---|---|
| WO 86/04559 | 8/1986 | WIPO . | |
| WO 86/07564 | 12/1986 | WIPO .................................... | 156/515 |

*Primary Examiner*—Mathieu D. Vargot
*Attorney, Agent, or Firm*—Ronald E. Greigg; Edwin E. Greigg

[57] ABSTRACT

A transverse sealing device in a tubular bag forming machine that has two sealing jaws with flat sealing faces disposed in an interstice between two pairs of clamping jaws, and also has a severing knife for longitudinally dividing the crosswise seam made by the sealing jaws. In order to remove the severing knife from the thermal influence of the sealing jaws, the severing knife is disposed and is movable separately from the sealing jaws and in a position of repose is located outside the range of motion of the sealing jaws. To that end, an aperture is provided in one of the clamping jaws for receiving the severing knife in the position of repose, and an arm supports the severing knife and also protrudes through the aperture.

10 Claims, 1 Drawing Sheet

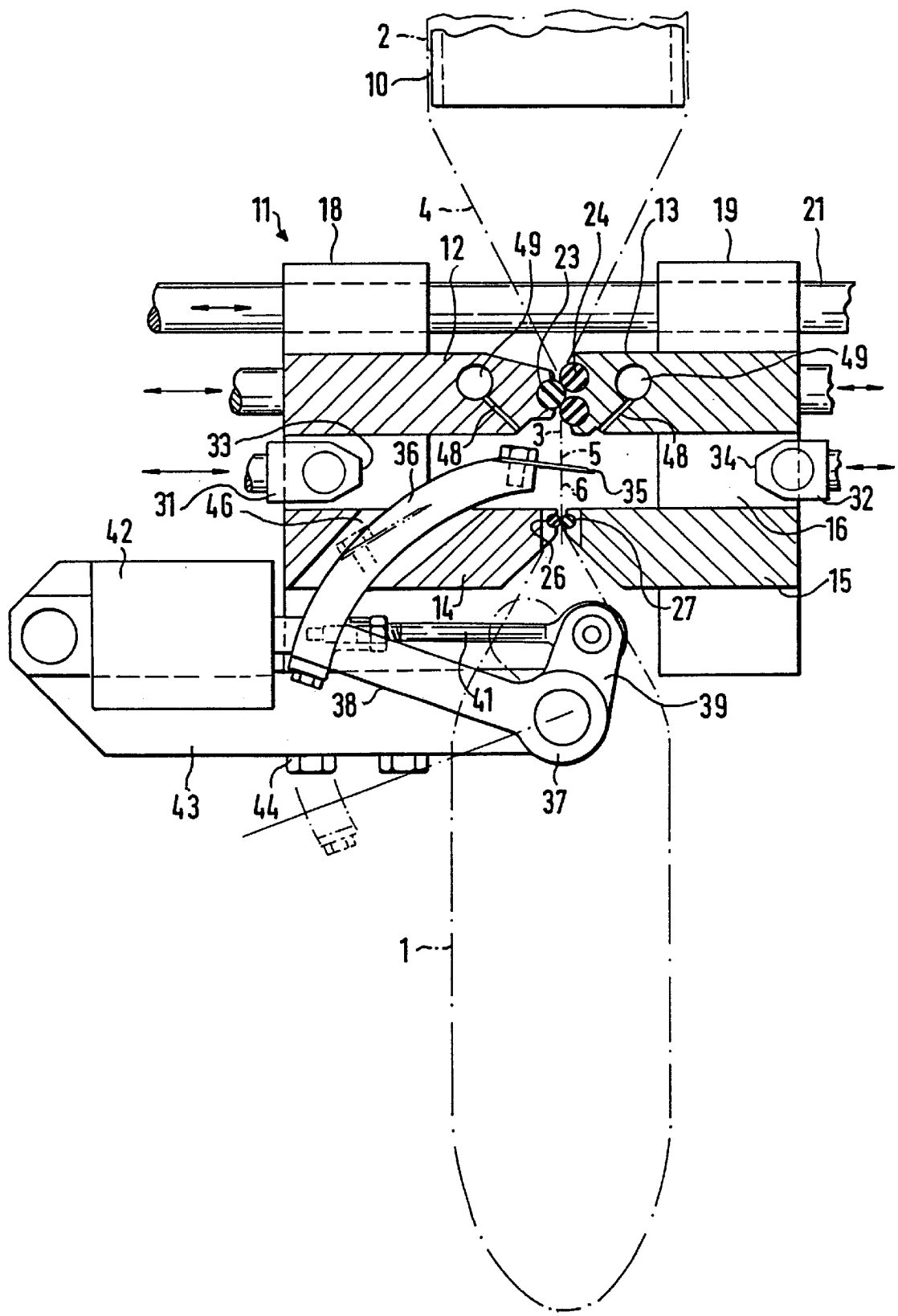

TRANSVERSE SEAM SEALING DEVICE FOR A BAG FORMING AND FILLING MACHINE

PRIOR ART

The invention relates to a transverse sealing device in a tubular bag forming machine for producing tubular bag packages. In such known tubular bag forming machines, first a tube is formed continuously from a sheet of packaging material and then the tube is advanced by the length of one bag at a time; a quantity of a product is placed in its sealed end portion, and this end portion is severed by means of a crosswise seam, which in the just-finished bag package forms a top seam and on the new tubular end portion forms a bottom seam. By means of a cut between the top and bottom seams, the finished bag package is severed. The tube is engaged in an upper position by two pairs of clamping jaws, which engage above and below the location of the crosswise seam, and is then advanced by the length of one bag and finally released. After that, the transverse sealing device returns to the upper position in order to begin a new work cycle. The sealing jaws of the transverse sealing device can be moved back and forth in an interstice between the two pairs of clamping jaws. The sealing face of the sealing jaws is interrupted by a groove, in which a severing knife for cutting off the finished bag package between the top seam of the bag package and the bottom seam of the tubular end portion is placed. In some devices, the severing knife is seated fixedly in one of the sealing jaws and already severs the tube upon closure of the sealing jaws, and dips into a groove in the other sealing jaw. In another embodiment, the severing knife can be advanced and retracted within a groove of the sealing jaw and has its own drive mechanism. It is thrust forward after the sealing operation, in order to carry out the severing of the crosswise seam.

Both embodiments of the known transverse sealing devices have the disadvantage that the severing knife is heated to nearly the sealing temperature by being embedded in a sealing jaw. Moreover, because of the dividing of the sealing face by the groove for receiving the severing knife, a narrow unsealed strip in which particles of the product are located remains on the tube between the top seam of the tubular bag package and the bottom seam of the tubular end portion. Particles of the product repeatedly come into contact with the heated severing knife as they penetrate this strip and then seize and burn on the hot surface of the severing knife. The residue of this burning then cause problems in severing the tubular bag packages from the tube.

ADVANTAGES OF THE INVENTION

The transverse sealing device according to the invention has the advantage over the prior art first that particles of the product are firmly bound in the crosswise seam region of the tube, and second that the severing means has a temperature at which it is not possible for the product particles to burn onto the severing knife. The result in operation of the device is the major advantage that very long service lives of the severing device are attained.

BRIEF DESCRIPTION OF THE DRAWING

One exemplary embodiment of the invention is shown in the drawing and will be described in detail below. The sole drawing shows a transverse sealing device in a tubular bag forming machine in cross section.

DESCRIPTION OF THE EXEMPLARY EMBODIMENT

A transverse sealing device 11 is disposed below the forming tube 10 of an apparatus for forming, filling and sealing bag packages 1. This transverse sealing device can preferably be raised and lowered in order to advance the tube 2 formed around the forming tube 10 from a length of packaging material. As known per se and therefore not shown in detail, the transverse sealing device 11 is disposed on a carrier which is moved up and down by the length of one bag at a time. As an alternative, the transverse sealing device may also be stationary, if the tube, as is also known per se, is transported by a tube advancing device.

The transverse sealing device 11 has two pairs of clamping jaws, 12, 13 and 14, 15, which are spaced apart from one another one above the other by an interstice 16. The clamping jaws 12, 14 and 13, 15, respectively, are secured on each side of the tube 2 at their ends on cheeks 18, 19, which are displaceable counter to one another on horizontal guide rods 21 by a linear drive mechanism, known per se and not shown, so that the clamping jaws can firmly clamp the tube 2. In side walls facing one another of the clamping jaws 12, 13; 14, 15, elastic clamping pieces, such as strands 23, 24, 25 and 26, 27, preferably of rubber, are inserted in order to increase the friction; when the pairs of clamping jaws 12, 13; 14, 15 are pressed together, these clamping pieces press the tube 2 located between them flat and firmly hold the tube, and the tubular portion 3 located between the upper clamping jaw pair 12, 13 and the lower clamping jaw pair 14, 15 is fastened flatly.

One sealing jaw 31, 32 plunges from each side into the interstice 16 between the two pairs of clamping jaws 12, 13; 14, 15; these sealing jaws are movable by a linear drive mechanism counter to one another parallel to the clamping jaws and counter to the tubular portion 3 fastened there and can be pressed together to make a crosswise seam.

A severing knife 35 can also be introduced into the interstice 16; on its advancement, it severs the fastened tubular portion 3, after a crosswise seam has been made by the sealing jaws 31, 32 crosswise to the direction of the tube; the crosswise seam is divided lengthwise into a bottom seam 5 on the tubular end portion 4 and a top seam 6 on the finished bag package 1. The severing knife 35 is secured to a curved arm 36, which in turn is secured to an arm 38 of a bell crank 37 which can be pivoted on a carrier 43 and whose other arm 39 is pivotably connected to the piston rod 41 of a pneumatic cylinder 42 that is suspended, likewise pivotably, on the carrier 43. The carrier 43 is secured on the underside of one of the cheeks 18 by means of screws 44. The drive mechanism 36–43 for the severing knife 35 is disposed on the lower end of the cheek 18 that carries the left-hand clamping jaws 12, 14. The clamping jaw 14 which is the lower clamping jaw there has an aperture 46, into which the severing knife 35 is retracted into its position of repose and which is penetrated by the arm 36 of the severing knife 35 when the latter has been moved into its working position. On the one hand, in the position of repose of the severing knife 35, the adjacent sealing jaw 31 can be moved unhindered into the interstice 16 toward the fastened tubular portion 3, and on the other, the severing knife 35 can be put into operation when the sealing jaw 31 is in its outset position.

The transverse sealing device 11 functions as follows: When the transverse sealing device 11 is moved upward into the upper position near the forming tube 10, the clamping jaws 12, 13; 14, 15 and the sealing jaws 31, 32 are moved apart, and the severing knife 35 is in the position of repose in the aperture 46 of the clamping jaw 14. In the upper position, the clamping jaws 12, 13; 14, 15 are then first moved from both sides toward one another and toward the tubular end portion 4, pressing the tubular end portion 4 together, so that between the two pairs of clamping jaws 12, 13 and 14, 15, the tubular portion 3 is formed that divides the bag package 1 to be finished from the tubular end portion 4. With a slight delay, the two sealing jaws 31, 32 are then moved toward one another as well, so that with their flat sealing face 33, 34 they press together the tubular portion 3 over a certain width and form a crosswise seam by transferring heat.

After a certain sealing time, the sealing jaws 31, 32 move back into their outset position. As soon as the interstice 16 is free, the severing knife 35 is thrust forward out of the aperture 46 toward the middle of the crosswise seam made on the tubular portion 3 and then retracted again, thus severing this seam lengthwise and forming the top seam 6 of the finished bag package 1 and the bottom seam 5 on the new tubular end portion 4. During the sealing and severing of the bottom and top seams 5, 6, during which the tubular end portion 4 and the new bag package 1 are held by the clamping jaws 12, 13; 14, 15, the transverse sealing device 11 moves downward by the length of one bag, and the tube 2—is advanced on the forming tube 10. In the lower position, the clamping jaws 12, 13; 14, 15 then open and release the finished bag package 1 and the tubular end portion 4 and move back into the upper position.

It will be noted in addition that the severing knife 35, in order to attain a clean, easily performed cut at the crosswise seam or to attain a pulling cut, may have an oblique, sawtooth or other shape of cutting edge. Moreover, for rapid cooling down of the crosswise seam after the sealing jaws 31, 32 have been raised from it, cooling air is briefly blown from nozzles 48 in the upper clamping jaws 12, 13. The cooling air is supplied to the nozzles 48 through longitudinal bores 49 in the clamping jaws 12, 13. Finally, it will also be noted that the path of motion of the severing knife 35 may not nearly be curved but may also be linear.

The foregoing relates to preferred exemplary embodiments of the invention, it being understood that other variants and embodiments thereof are possible within the spirit and scope of the invention, the latter being defined by the appended claims.

We claim:

1. A transverse sealing device (11) in a tubular bag forming machine, comprising first and second pairs of clamping jaws (12, 13; 14, 15) movable and pressable counter to one another and defining an interstice (16), a pair of sealing jaws (31, 32), which include sealing faces (33, 34), said sealing jaws dip into the interstice (16) and are movable out of an outset position into a sealing position and which in the sealing position compress a bag tube (2) crosswise and in so doing makes a top transverse seam (6) on a bag package (1) to be completed and a bottom transverse seam (5) on a tubular end portion (4) of a bag by transferring pressure and heat, a severing means (35), which after the top and bottom transverse seams (5, 6), have been formed, the severing means (35) severs the bag package (1) from the end portion (4) of the bag tube between the previously formed top and bottom transverse seams, said severing means is actuated by a drive mechanism (36-42) separate from the drive mechanism if the sealing jaws (31, 32), the sealing faces (33, 34) of the sealing jaws (31, 32) that form the top seam (6) of the finished bag package (1) and the bottom seam (5) of the tubular end portion (4) are continuously flat, and that the serving means (35) is moved out of the working position, in which the severing means severs the tubular bag package (1) from the tubular end portion (4) between the previously formed top and bottom transverse seams into a position of repose, which is located outside a range of motion of the sealing jaws (31, 32).

2. A transverse sealing device in accordance with claim 1, in which a hollow space (46) for receiving the severing means (35) in its position of repose is disposed in one of the clamping jaws (14).

3. A transverse sealing device in accordance with claim 2, in which the hollow space is formed by an aperture (46) in the clamping jaw (14), through which an arm (36) that supports the severing means (35) moves.

4. A transverse sealing device in accordance with claim 1, in which the severing means is embodied as a flat severing knife (35) secured on a pivotable arm (36).

5. A transverse sealing device in accordance with claim 2, in which the severing means is embodied as a flat severing knife (35) and is secured on a pivotable arm (36).

6. A transverse sealing device in accordance with claim 3, in which the severing means is embodied as a flat severing knife (35) and is secured on a pivotable arm (36).

7. A transverse sealing device in accordance with claim 3, in which the arm (36) is disposed on a bell crank (37), which is pivoted by a linear motor (42).

8. A transverse sealing device in accordance with claim 4, in which the arm (36) is disposed on a bell crank (37), which is pivoted by a linear motor (42).

9. A transverse sealing device in accordance with claim 5, in which the arm (36) is disposed on a bell crank (37), which is pivoted by a linear motor (42).

10. A transverse sealing device in accordance with claim 6, in which the arm (36) is disposed on a bell crank (37), which is pivoted by a linear motor (42).

* * * * *